(12) United States Patent
Bullock (10) Patent No.: US 7,604,443 B2
(45) Date of Patent: Oct. 20, 2009

(54) ADJUSTABLE LOAD STABILIZER METHOD AND APPARATUS

(76) Inventor: Matthew Bullock, 6314 Georgetown Pike, McLean, VA (US) 22101

( * ) Notice: Subject to any disclaimer, the term of this patent is extended or adjusted under 35 U.S.C. 154(b) by 494 days.

(21) Appl. No.: 11/459,357

(22) Filed: Jul. 23, 2006

(65) Prior Publication Data
US 2008/0019791 A1    Jan. 24, 2008

(51) Int. Cl.
B60P 7/08    (2006.01)
(52) U.S. Cl. .................. 410/123; 410/128; 410/151; 410/154; 410/155
(58) Field of Classification Search .................. 410/123, 410/127, 128, 151, 154, 155; 248/354.3, 248/354.4, 354.6; 114/75; 211/105.4
See application file for complete search history.

(56) References Cited

U.S. PATENT DOCUMENTS

| | | | |
|---|---|---|---|
| 3,612,463 A | 10/1971 | Grant | |
| 4,553,888 A | 11/1985 | Crissy et al. | |
| 4,815,905 A * | 3/1989 | Garcia, Jr. ............... | 410/128 |
| 5,037,256 A | 8/1991 | Schroeder | |
| 5,062,751 A | 11/1991 | Liebel | |
| 5,132,156 A | 7/1992 | Trassare, Jr. et al. | |
| 5,139,842 A | 8/1992 | Sewell | |
| 5,484,643 A | 1/1996 | Wise et al. | |
| 5,846,038 A | 12/1998 | Bostelman | |
| 5,855,459 A | 1/1999 | Krier et al. | |
| 5,947,666 A | 9/1999 | Huang | |
| 6,419,434 B1 | 7/2002 | Rahn | |
| 6,435,787 B1 | 8/2002 | John | |
| 6,527,488 B2 | 3/2003 | Elze et al. | |
| 6,533,513 B2 | 3/2003 | Kanczuzeswski et al. | |
| 6,568,636 B2 | 5/2003 | Fitzgerald | |

* cited by examiner

Primary Examiner—Stephen Gordon
(74) Attorney, Agent, or Firm—Bradford Kile; Kile Goekjian Reed & McManus (57) ABSTRACT

A method and apparatus for stabilizing cargo within a transport container is presented. First and second tubular elements are provided having generally cylindrical bodies and bases at a terminal end which can react against opposing surfaces within the transport container and stabilize cargo within the container. An extension mechanism allows for the extension and selective translation between the first and second tubular members allowing the apparatus to extend and fill the space between opposing surfaces within the transport container and stabilize the cargo. A method for stabilizing cargo within a transport container includes providing an extensible load stabilizer having first and second tubular elements, each having a base, positioning the load stabilizer between opposing surfaces within the transport container, and extending the tubular members with respect to each other, and stabilizing a surface of cargo against an opposing surface.

6 Claims, 12 Drawing Sheets

ADJUSTABLE LOAD STABILIZER METHOD AND APPARATUS

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; to U.S. Pat. No. 7,322,781 entitled "Adjustable Load Stabilizer Method and Apparatus" issued on Jan. 29, 2008 and application Ser. No. 11/459,356 filed Jul. 23, 2006 and entitled "Adjustable Load Stabilizer Method and Apparatus" all of common inventorship with the subject application. The disclosure of U.S. Pat. No. 7,322,781 and application Ser. No. 11/459,356 as both are referenced above, are hereby incorporated by reference as though set forth at length.

BACKGROUND OF THE INVENTION

This invention relates to an improved method and apparatus for stabilizing cargo during transportation. More particularly, this invention relates to a novel method and apparatus for stabilizing and restraining undesired movement of drums, boxes, rigid and flexible containers, palletized or not palletized, within the interior of a transport container or the like with respect to each other and/or with respect to the internal walls of the container.

Most shipments for transport are placed in enclosures such as ship cargo holds, intermodal containers, truck trailers, truck bodies, railroad box cars, and the like. Examples of cargo in containment enclosures include fifty five gallon closed head drums, super sacks or plastic reinforced bags, plastic wrapped bundles, cased goods, metal coils, specialty heavy paper rolls, plastic or metal containers mounted on pallets, etc. Although each individual component of cargo may be quite heavy and stationary at rest, the mass of a transport load can produce considerable momentum force as a ship, railroad car, truck trailer or truck body is placed in motion, stops, or changes direction.

During ocean shipping, cargo within cargo holds or intermodal containers are subjected to wave forces including: yaw, pitch, heave, sway, and surge. Depending upon weather conditions and the size of the vessel, cargo can experience various magnitudes of shifting forces throughout the course of a transoceanic voyage.

In another transport context, railroad trains are made-up by individual box cars being rolled together in a switching yard. When a railroad car is rolled into a stationary string of cars, the impact causes the car couplings to lock together with a jolt. This impact can apply a significant force to cargo within the rail car. Moreover, during transport, railroad cars and overland transport vehicles are subject to braking forces, bumps, centrifugal forces on curves, vibration, dips in the track or road, swaying, run-in or run-out forces, etc.

In overland truck/trailer transport there are frequent brake and acceleration forces imparted to the trailer and its contents, centrifugal forces around curves, turning forces, uneven road surfaces, roadway transition junctions, roadway grades, etc.

Each of these forces has the potential to impart a substantial force to cargo during transport. When cargo contacts other cargo or the interior walls or doors of a container, the force necessary to reduce its momentum to zero must be absorbed by the goods and/or the container. Such forces can result in damage to the cargo, damage to the interior walls or doors of the container, damage to the cargo packaging, and may even create dangerous leaks if the cargo is a hazardous material. Accordingly, it is undesirable to permit cargo to gain any momentum independent of other cargo or a transport container. This can be accomplished by stabilizing the cargo within the container with respect to other cargo and/or the internal walls of the container so that the cargo and container are essentially united and operationally function as a single object during transport.

In order to stabilize cargo with respect to other cargo and the internal walls of a transport container or cargo hold, various forms of load containments, load spacers and void fillers have been used to fill the spaces between cargo and between cargo and the internal walls of an intermodal container, box car, cargo hold, truck trailer, etc. Often, load containment enclosures are secured to the floor or sides of the transport container and prevented from moving with respect to each other by specially fabricated wood or steel framing, floor blocking, rubber mats, steel strapping, or heavy air bags. A variety of dunnage materials and void fillers has been used to prevent the movement of cargo with respect to other cargo and the internal walls of the transport container. Each of these previously known systems has limitations associated with cost, lack of strength, amount of labor required for installation, time expended for installation, lack of flexibility, securement integrity, transportability and storage of spacer elements, etc.

Further to the above, in the past, various dunnage materials have been utilized within transport containers to eliminate unwanted movement or shifting of a load. Drums, boxes, or other containers have been restrained in several different ways. Primarily, cargo has been stabilized by the use of void fillers such as collapsible cardboard frames or cells. These systems use strips of corrugated cardboard configured and assembled to expand into solid rectangular frames or cells of various forms and sizes and incorporate honeycomb and/or diamond-shaped cells for space and strength considerations. These systems while useful for known rectangular voids can exhibit impaired performance due to size and/or dimension variance. Moreover curved surfaces can not be accommodated well with rectangular shaped void fillers. The difficulty in applying various rectangular units to irregular shapes and the on site adjustment for varying sizes of voids to be filled, the unsuitability of corrugated board to absorb strong compression forces, and the use of materials not fully resistant to moisture can impair use of this type of dunnage void filler system.

Other known means of restraint such as the use of inflatable dunnage bags used alone or in combination with collapsible void fillers have tended to exhibit the disadvantage that air bags are subject to rupturing, leakage and loss of air pressure, or simply contraction and securement loosening in low temperature environments.

In addition to the above, other restraining systems known in the past often required additional elements and equipment which tended to be cumbersome to store, arduous to handle and/or install, and often required a degree of skilled labor in application.

Finally, in certain instances wood block and bracing has been used in the past to fill voids and secure loads; however, wood bracing is somewhat time consuming to install and often requires skilled or semi-skilled labor which is often contracted out to third parties. In addition certain wood materials are not suitable for international transport without fumigation which increases the overall cost of the securement system.

Consequently, a need exists for securing cargo in cargo holds, transport containers, box cars, truck trailers and the like that is functionally effective, cost-efficient, and labor-efficient. Still further a need exists for load stabilization systems that have enhanced strength characteristics under a variety of environments, exhibit flexibility for loads of various types and sizes and limit cargo shifting within a container.

The problems suggested in the preceding are not intended to be exhaustive but rather are among many which may tend to reduce the effectiveness of load stabilizer methods and apparatus appearing in the past. Other noteworthy problems may also exist; however, those presented above should be sufficient to demonstrate that load stabilizing systems appearing in the past will admit to worthwhile improvement.

SUMMARY OF THE INVENTION

One embodiment of the invention comprises a method and apparatus for stabilizing cargo within a ship hold, transport container, box car, truck trailer, and the like with respect to other cargo and the internal walls of the container by the selective application of mutually extendible void filler cylinders. More specifically, stabilization is achieved by application of extension members, which are capable of longitudinal movement with respect to each other. Each extension member is coupled to a bearing member which is designed to abut directly or indirectly against a face of cargo or an internal wall of a transport container. Securement is achieved by extending the extension members with respect to each other to fill in a void between the face of opposing cargo surfaces or an internal wall of a container, or the like. A locking mechanism is advantageously used to hold the extension members in place

THE DRAWINGS

Other aspects of the present invention will become apparent from the following detailed description of embodiments thereof taken in conjunction with the accompanying drawings wherein.

DETAILED DESCRIPTION

Context of the Invention

Figure 1:
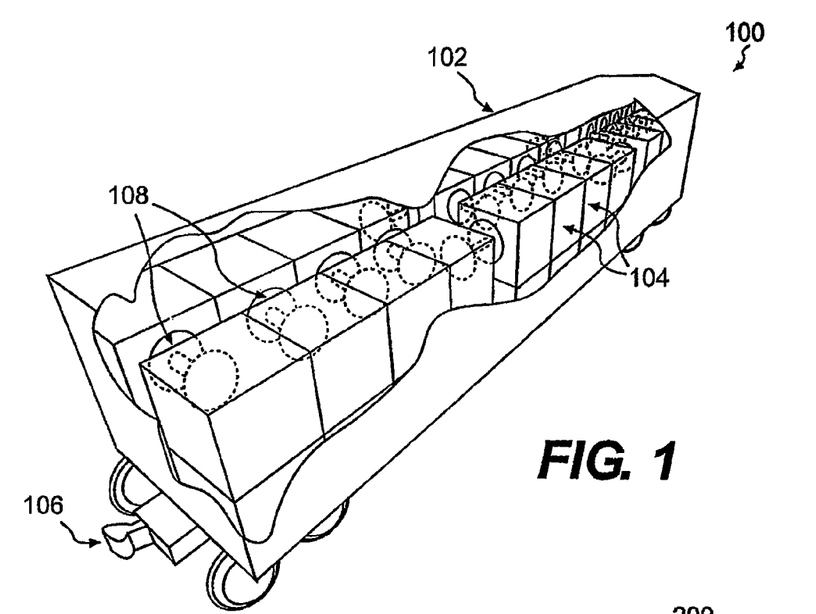
FIG. 1 is an axonometric view showing the interior of a railcard with cargo stabilized, both laterally and longitudinally, within the container in accordance with the subject invention.

Turning now to the drawing wherein like numerals indicate like parts, FIG. 1 shows an axonometric view of an operating environment 100 of the invention. In this, a railcar 102 is shown as a type of container that may be encountered. Railcars are used to transport a wide range of materials including many that must be protected from impact against the railcar walls as well as other cargo within the railcar. Cargo 104 must be protected from the shifting forces during transit. One particular force encountered in railcars specifically is the impact force created when two railcars are cased to collide in order to connect a coupling 106. The form of container 102 shown here is merely illustrative and the subject invention can be also used to advantage in ship cargo holds, intermodal containers and the like.

A partially cut away portion of FIG. 1 depicts various size and shapes of cargo 104, which are stabilized against each other and against the internal walls of the container 102 by load stabilizers 108 in both a lateral and longitudinal direction in accordance with the subject invention.

Figure 2:
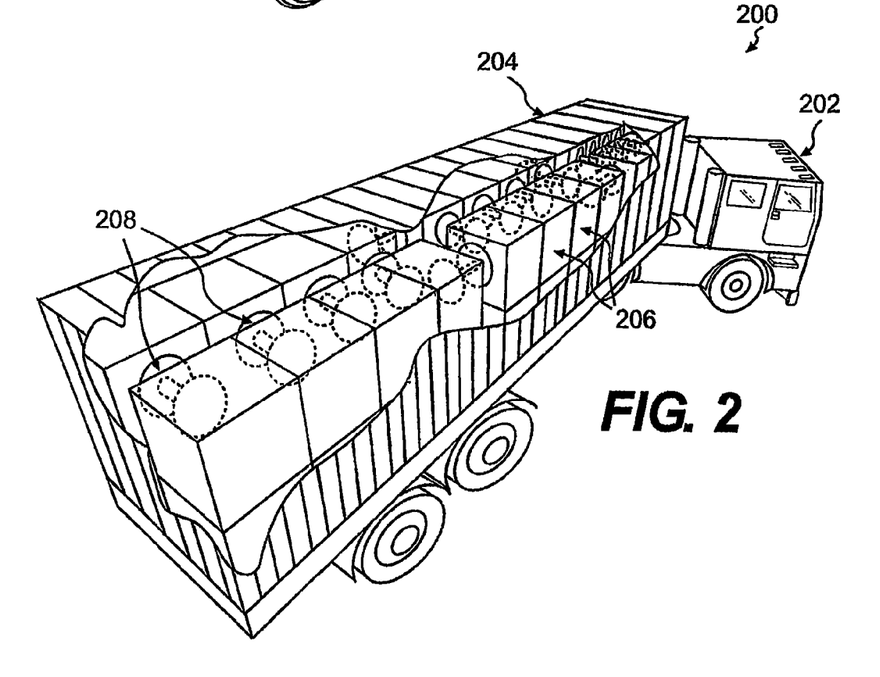
FIG. 2 is an axonometric view showing the interior of a transport container secured to a flatbed of a truck or truck trailer, with cargo stabilized within the container in accordance with the subject invention.

FIG. 2 shows another operational context 200 of the invention. In this context, container 204 is secured to a trailer towed by tractor 202. Cargo 206 is subject to a wide range of forces as discussed above. The braces or load stabilizers 208 of the subject invention protect the cargo from shifting and impact with other cargo and with the walls of the container 204.

Void Filler and Load Stabilizer

Figure 3:
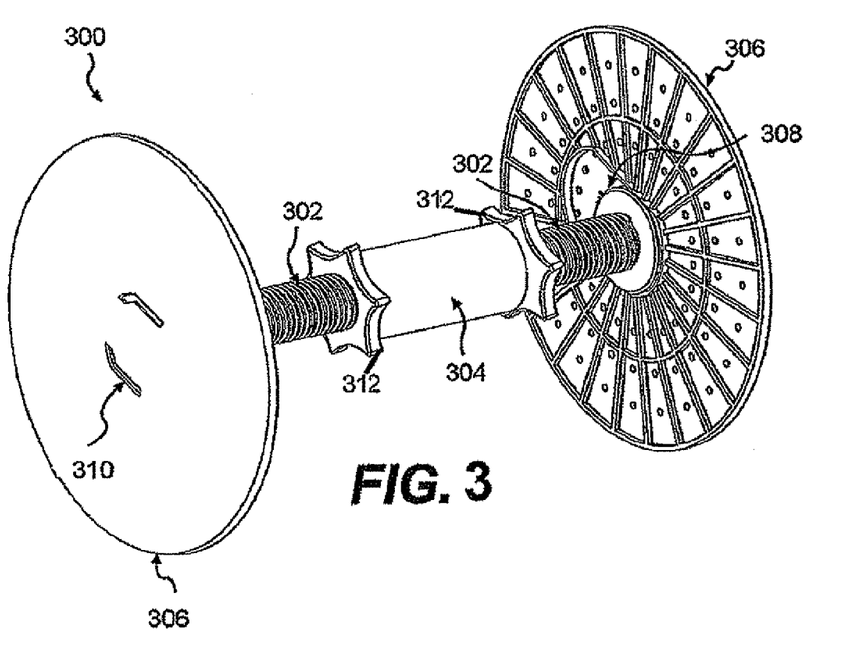
FIG. 3 is a perspective view of one embodiment of the invention comprising a turnbuckle arrangement of extension members between bearing members.

Turning now to FIG. 3 there is shown one preferred embodiment of the present invention. In this, a void filler 300 employs a turnbuckle configuration to extend and retract the bearing members. Male tubular members 302 are threaded to correspond to the internal threading of female member 304. When the female member 304 is turned with respect to the male members 302, this causes the bearing members 306 to either mutually extend or retract. The female member 304 may be turned by hand or with a tightening tool just as a lock-belt wrench. Male and female tubular members attach to the bearing members 306 by a base sliding into channels and locking at 308. Contours 310 are placed in bearing members 306 through the injection molding process and allow the bearing members to be extracted from the mold. This is not a requirement for the function of the invention.

This configuration is particularly useful because it allows the void filler to expand to fit relatively large spaces. The female member 304 may be reverse threaded for use as described above, or it may be a single threaded female member where only one male member is turned to extend to the container wall or to ether cargo. Locknuts 312 are tightened against female member 304 to secure the male members in place and prevent slippage.

The void filler 300 can be configured to always remain assembled or it can be configured to be broken down into its separate components. When the disassembled embodiment is used, then this invention provides the additional benefit of being easy to ship to its destination. For example, drop-down type cardboard void fillers can be shipped at approximately 100 pieces per pallet. The subject invention can be shipped at between 900 and 1000 pieces per pallet. This is due to its configuration and the ability to stack the base elements and closely pack the tubular members.

Figure 4:
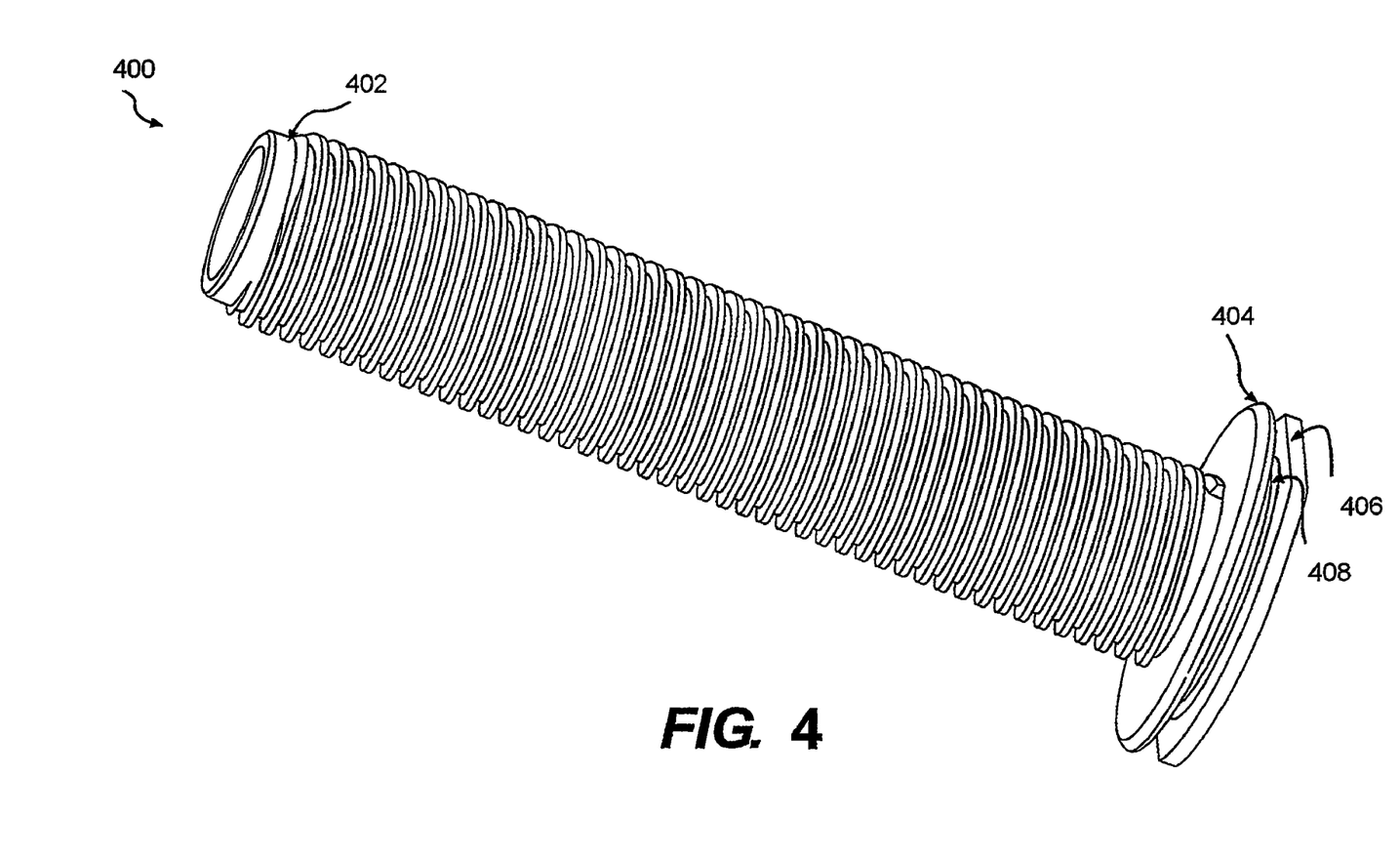
FIG. 4 is a perspective view of one extension member used in the embodiment of the invention depicted in FIG. 3.

FIG. 4 is a perspective view of a male tubular member 400 such as element 302 of FIG. 3. Threads 402 extend along the body of the tubular member and correspond to threads in a female tubular member such as element 304. In one embodiment, both tubular members are double threaded or even triple threaded so that two or three threads are used simultaneously. In another embodiment, these threads are set with a pitch, that cooperates with the coefficient of friction of the unit and weight of the unit that allows the tubular members to be self driving when the void filler is assembled and a turning force is applied. Lip 406 slides into place on a bearing member such as 306. The slots of the bearing member fit in space 408 and lip 404 rests on top of the bearing member slots for additional stability. Additional security is be provided by a small ramp that holds the tubular member in place and prevents sliding out of the slot on the bearing member.

Figure 5:
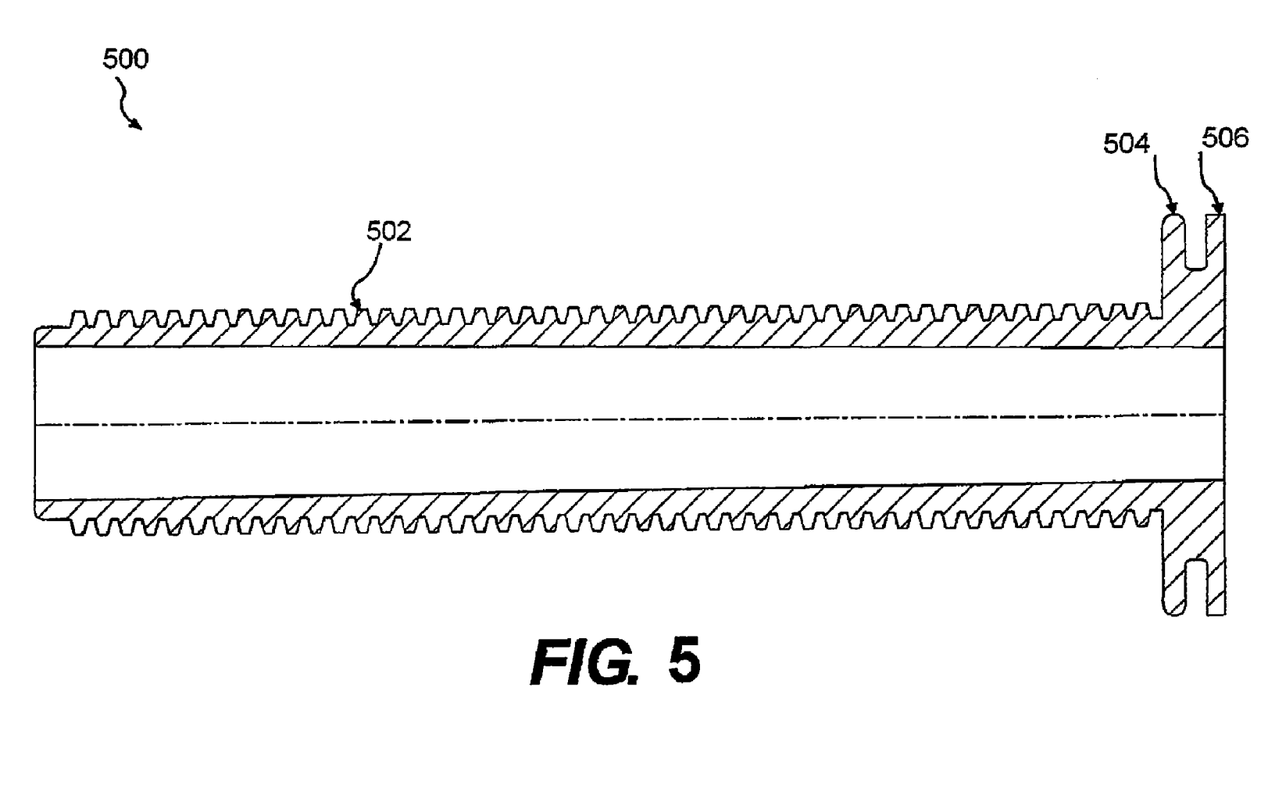
FIG. 5 is a cross-sectional view of the extension member as shown in FIG. 4.

FIG. 5 shows a cross-sectional view of a male tubular member 500 such as the one designated as element 302 in FIG. 3. Threads 502 correspond to the internal threads of a female tubular member. Lip 506 fits into slots on a bearing member as described above and lip 504 rests on the slots on a bearing member for stability as described above.

Figure 6:
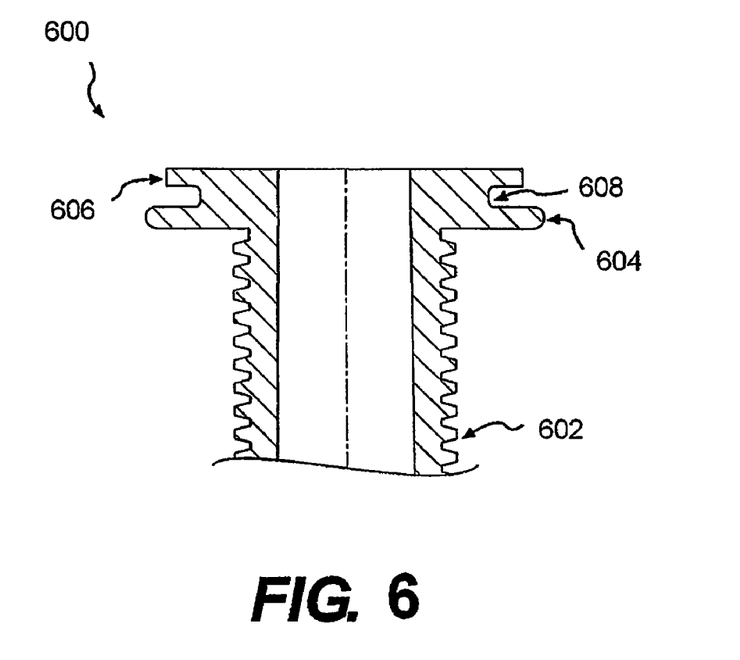
FIG. 6 is a rotated cross-sectional view of the extension member like the one shown in FIG. 5 rotated by 90 degrees.

FIG. 6 shows a view of the same member shown in FIG. 5 but rotated 90°. This view of a male tubular member 600 shows threads 602 as well as lips 604 and 606. The slots on the bearing member fit into spaces 608. This view shows that the lip 606 has flat sides to allow for fitting into the bearing member as described above.

Figure 7:
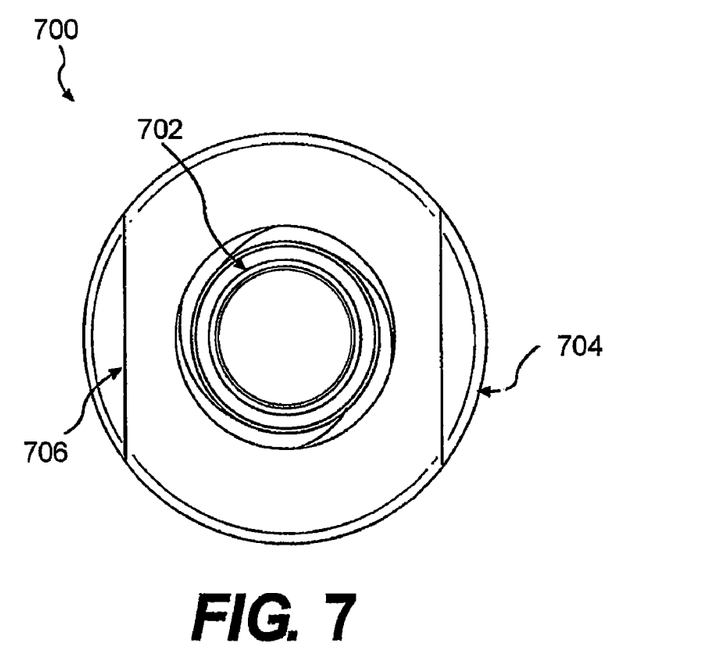
FIG. 7 is an end view of the extension member shown in FIG. 4.

FIG. 7 shows an end view of a male tubular member 700. Threads 702 fit into a female tubular member and lips 704 and 706 fit into a bearing member as described above.

Figure 8:
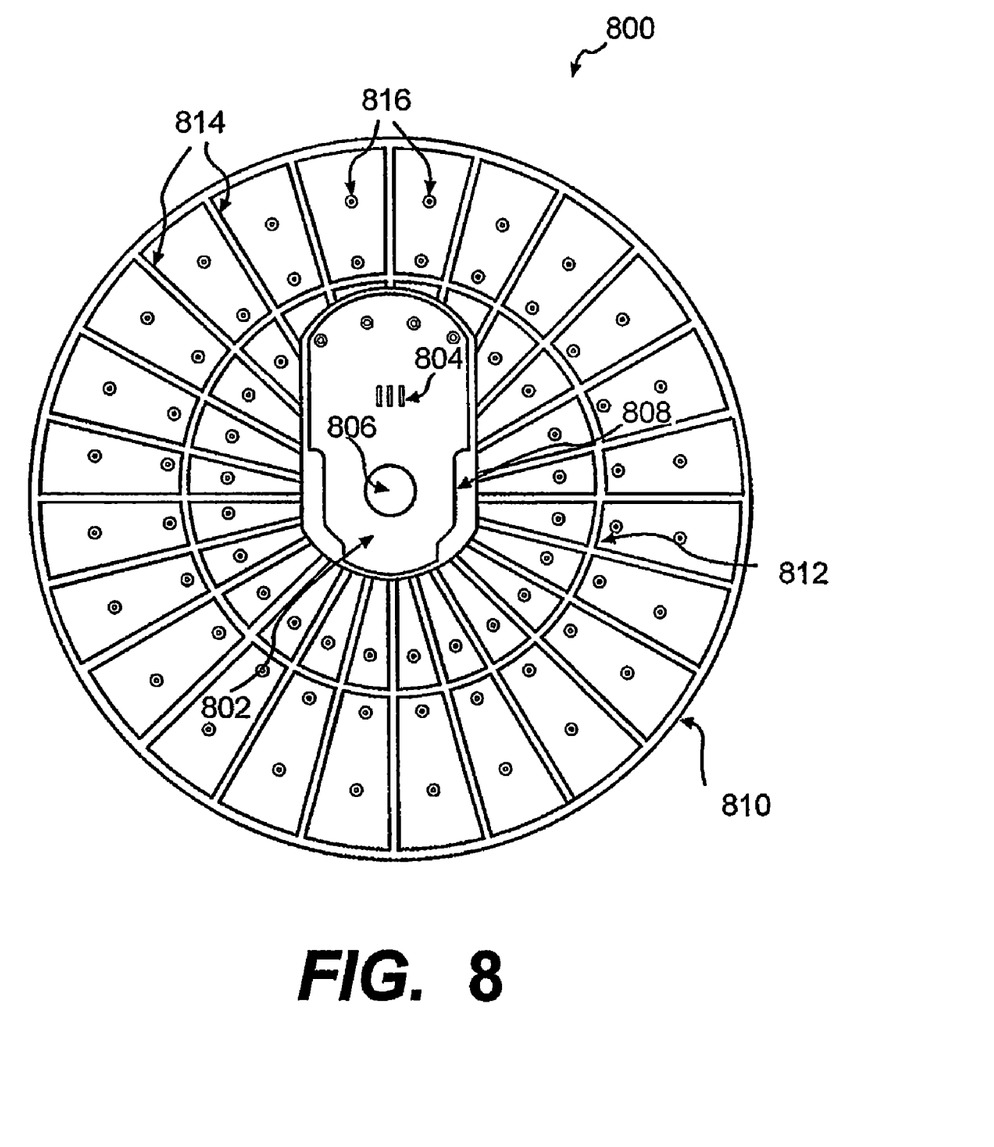
FIG. 8 is a view of one side of the bearing member that is attached to one of the two extension members.

FIG. 8 is a detailed plan view of the bearing member 800 with the side shown facing in toward the tubular members shown in FIG. 3, Tubular members, such as 302 and 304, attach to the bearing member 800 by base elements at the adjacent ends of the tubular members in position 802 of the bearing members. The tubular member is placed over ramp 804, then it can be slid down into position 802 by ensuring that the edge of the tubular member, to be detailed below, fits under slot 808 on each side. Once in position, ramp 804 ensures that the tubular member will not inadvertently slide out of its attachment with the base. Dimple 806 is slightly raised and gives additional security to the attachment of the tubular member.

For added strength, the bearing member 800 is reinforced. Reinforcement spines 810 and 812 provide circumferential reinforcement by being placed around the outside of the base as well as in a position between the outside of the base and the center of the base, as 812. There is no limit to the number of rings that may be used, the more rings, the greater the ability of the base to withstand outside stresses. Additionally, reinforcement spines 814 provide radial reinforcement. Again, there can be any number of reinforcement elements depending on the desired strength. Elements 810, 812 and 814 are made of the same material as the remainder of the base but are thicker and provide greater support. Nail, screw or other attachment holes 816 allow the base to be secured to any surface. These may be actual holes, or they may be portions of the base that are thin with respect to the rest of the base and allow nails, and the like, to be easily driven through.

The subject invention may be constructed of a wide range of materials. In one embodiment, the tubular members are constructed of high density polyethylene and the bases are constructed of acrylonitrile butadiene styrene (ABS.) The subject invention can be constructed of any one, or any combination of the following materials: polyvinyl chloride (PVC), ABS, polyethylene, and polystyrene. This lists is not meant to be exhaustive, any material that provides the requisite strength and reliability for protecting cargo may be used to advantage.

Figure 9:
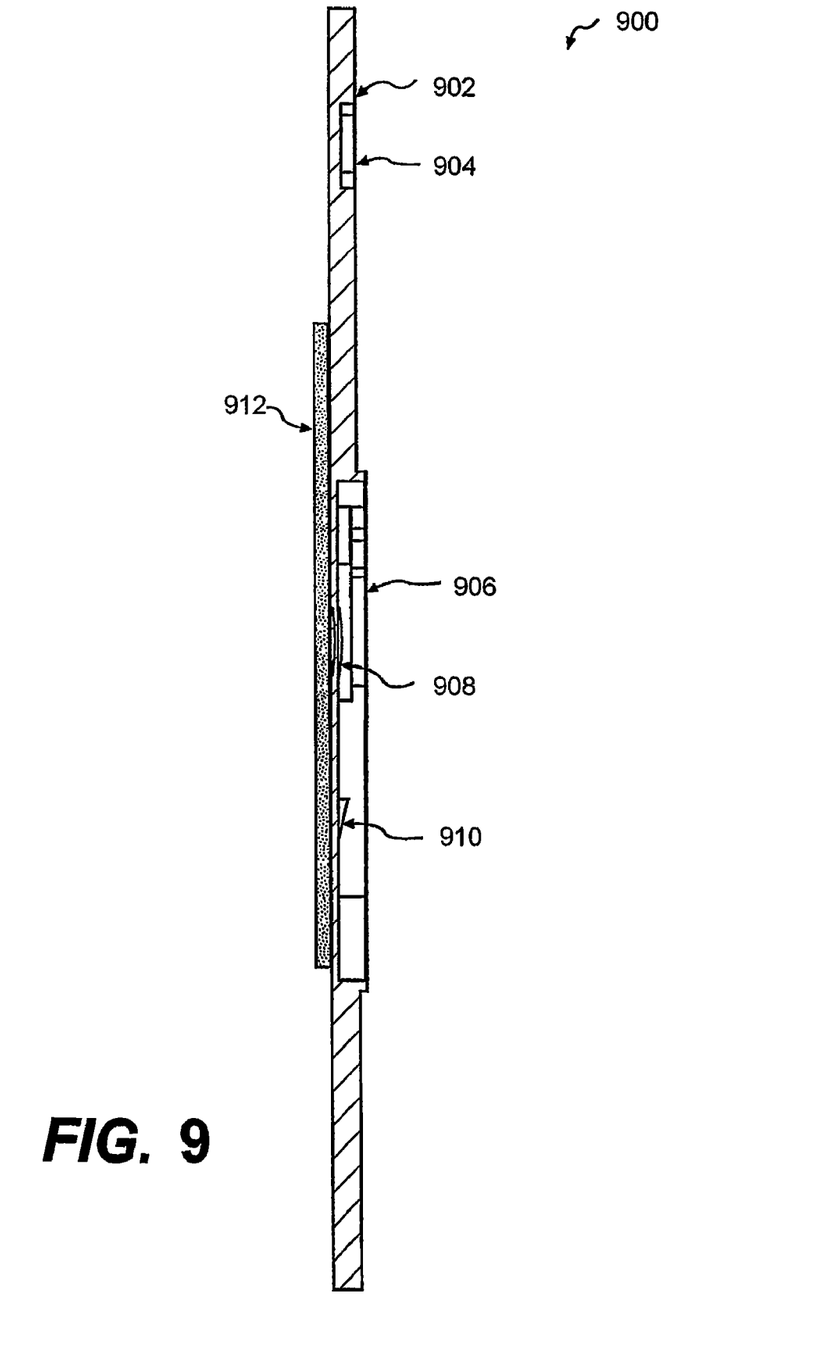
FIG. 9 is a side view of the bearing member shown in FIG. 8.

FIG. 9 shows a side view of a base 900 such as the one shown in FIG. 8. Tubular members such as 302 and 304 fit in slot 906 and are held in place by ramp 910. Dimple 908 also helps to hold the tubular member securely in place. The tubular members are released by slightly bending the base to slide the tubular member over ramp 910. Nail hole 904 is shown extending only partially through base 900. A nail can be driven through this and into a surface. Optional adhesive element 912 allows the base to be adhered to a container wall or opposing cargo so it can be easily positioned and the void guard assembled by one person. Typically, this adhesive will be on a base attached to a male tubular member so the female member is free to turn into position. With the turnbuckle embodiment the adhesive may be provided on the outside surface of each of the load bearing members.

Figure 10:
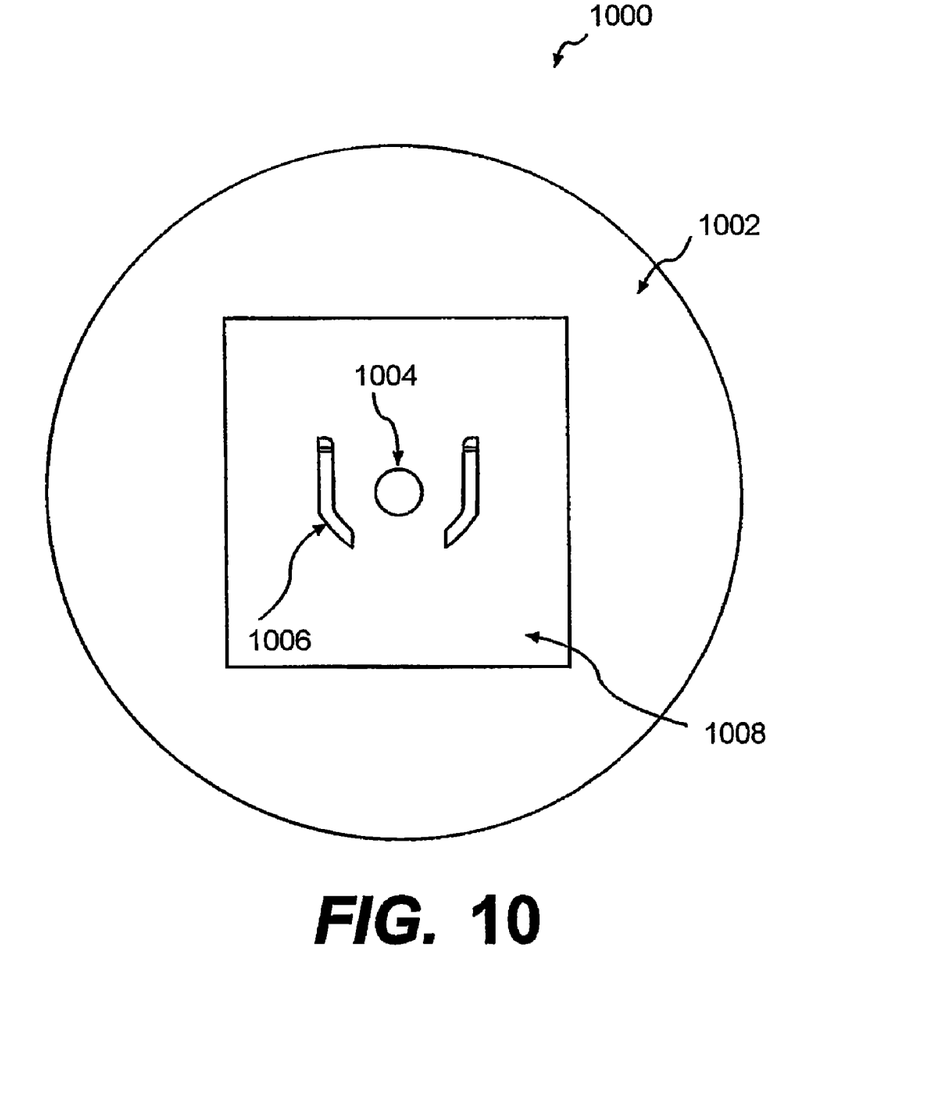
FIG. 10 is a view of an opposite side of the bearing member shown in FIG. 8.

FIG. 10 shows an opposite side of a bearing member 1000 such as the one shown in FIG. 8. Surface 1002 is smooth and contacts either the container wall or a surface of cargo in the container. Dimple 1004 and holes 1006 are products of the injection molding process and are not required for the function of the void filler although dimple 1004 does provide extra security for the inserted tubular member on the opposite side as described above. The primary requirement for this surface is that is not have protrusions extending out that would damage the cargo. However, in another embodiment, the user may require a mechanical connection with the cargo and damage is not an issue; in this case, protrusion off the base could be used to secure the base to the surface. Optional adhesive element 1008 allows the base to be removeably affixed to either a cargo surface or a container wall.

Figure 11:
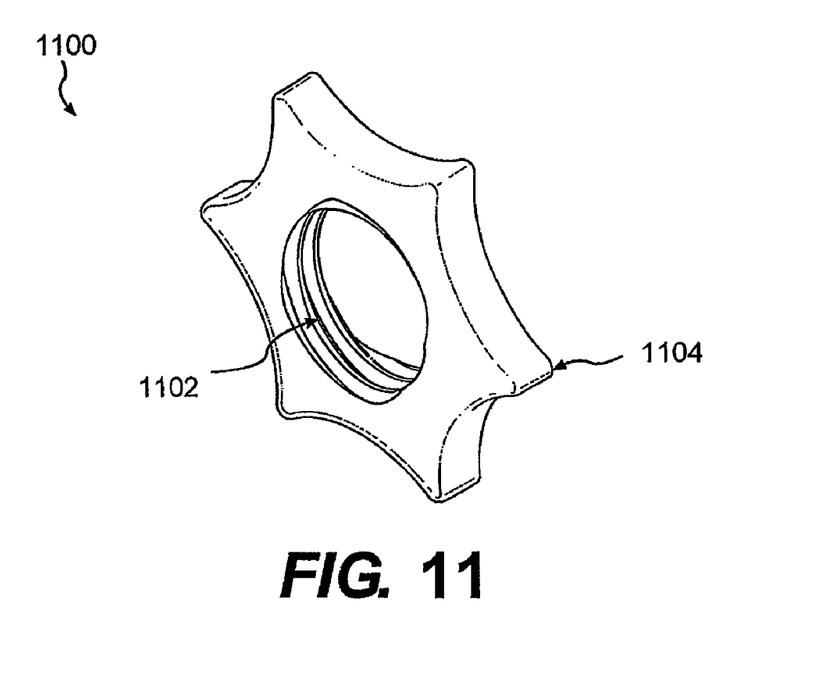
FIG. 11 is a perspective view of a locknut used in one embodiment of the invention.

FIG. 11 is a perspective view of a locknut 1100 such as the one labeled 312 in FIG. 3. Threads 1102 correspond to the threads of a male tubular member, such as element 302. Contours 1104 allow the locknut to turned into place by hand and may take a variety of forms. The locknut may also be shaped to correspond to a turning tool and tightened into place with that tool.

Figure 12:
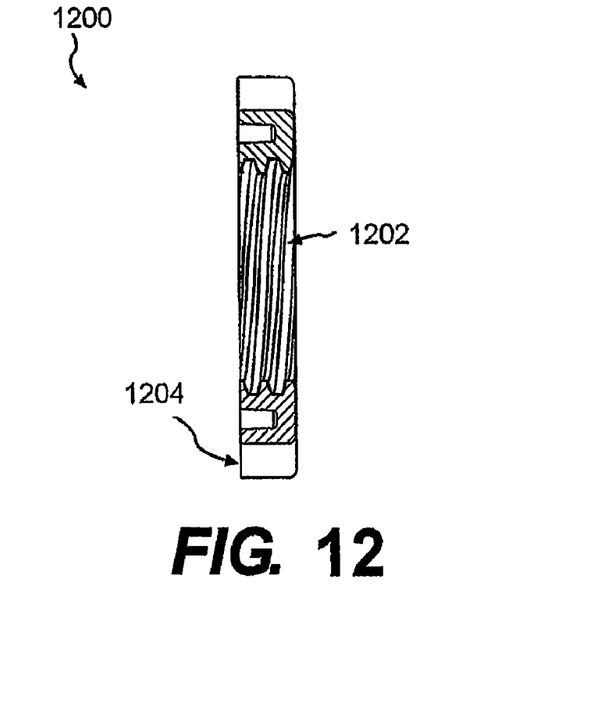
FIG. 12 is a cross-sectional side view of the locknut shown in FIG. 11.

FIG. 12 is a cross sectional view of the same locknut, labeled 1200. Threads 1202 and contours 1204 correspond to those described above regarding FIG. 11.

Figure 13:
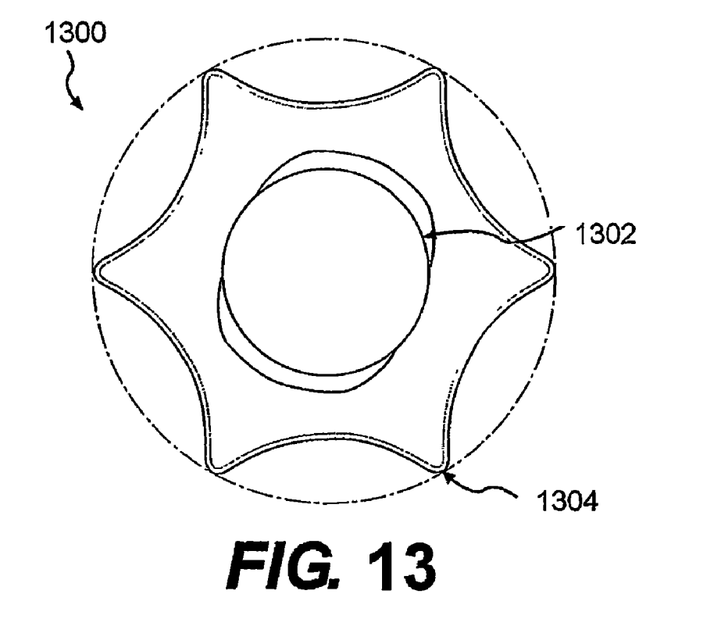
FIG. 13 is a front view of the locknut shown in FIG. 11.

FIG. 13 is another view of the locknut 1300 such as the one illustrated in FIGS. 11 and 12. Threads 1302 and contours 1304 correspond to those described above regarding FIG. 11.

Figure 14:
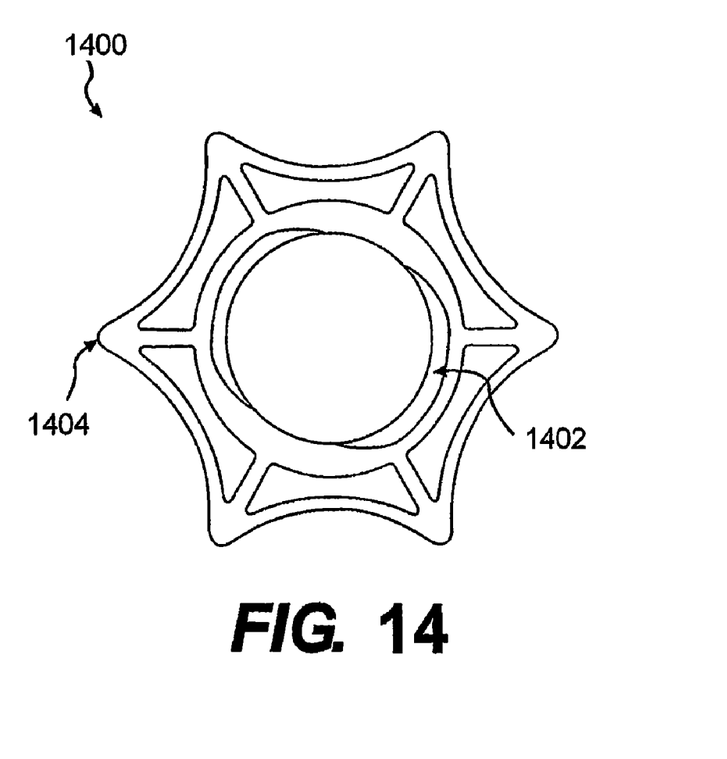
FIG. 14 is a back view of the locknut shown in FIG. 11.

FIG. 14 is an opposite end view of a locknut 1400 such as the one shown in previous FIGS. 11-13. Threads 1402 and contours 1404 correspond to those described above regarding FIG. 11. Note reinforcing spines radiating out to provide additional stability and strength for the locknut 1400.

Figure 15:
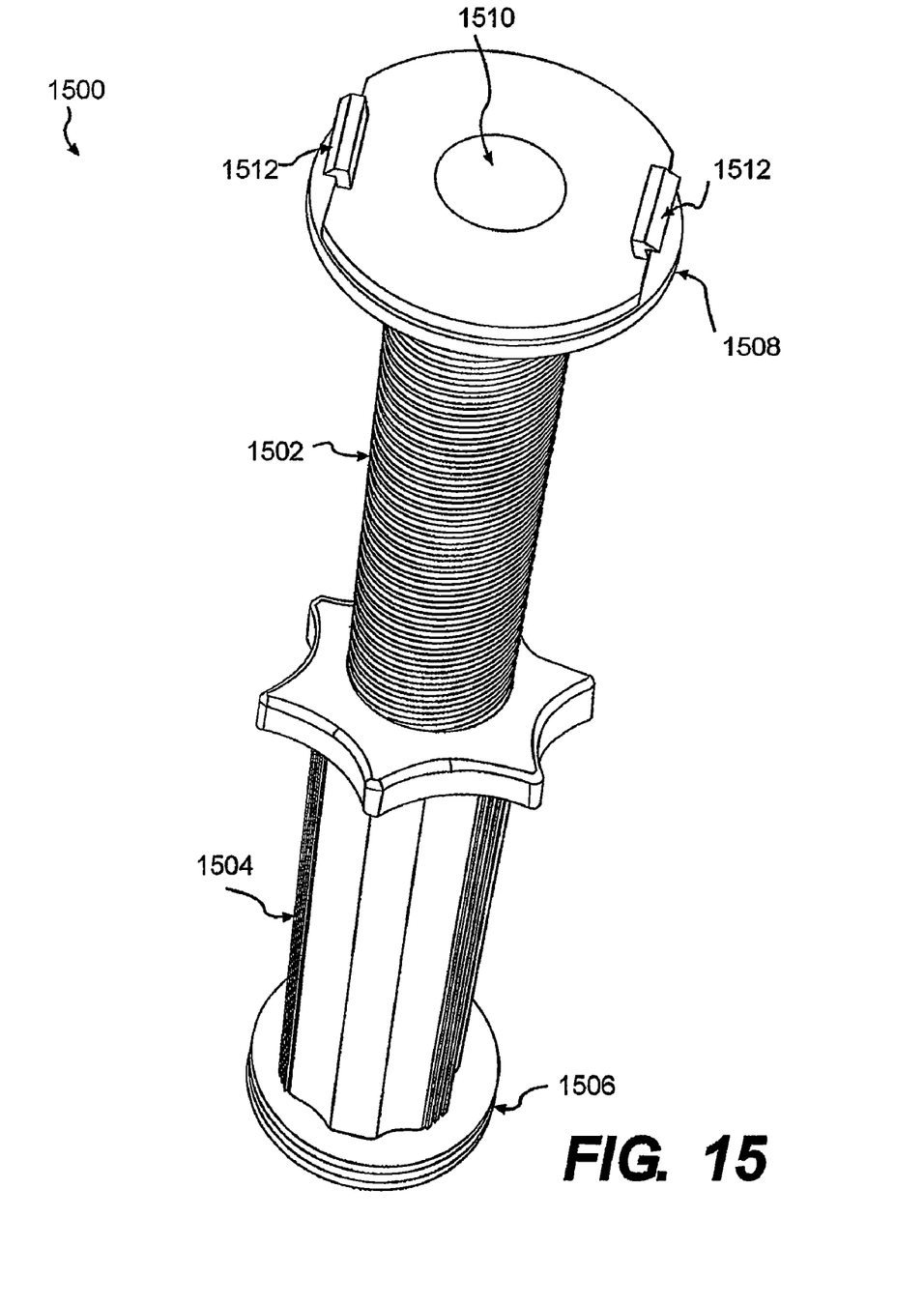
FIG. 15 is a perspective view of the tubular members that may be used in an alternate preferred embodiment of the invention.
Figure 16:
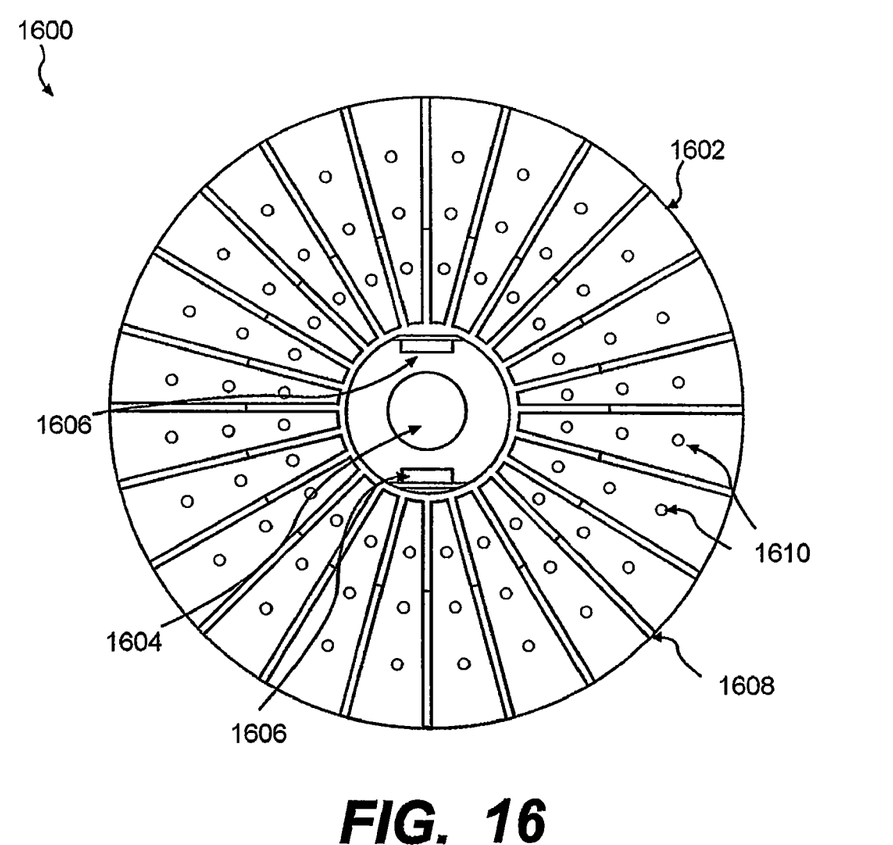
FIG. 16 is a plan view of a bearing member that is employed in the embodiment of the invention shown in FIG. 15.

FIG. 15 is a perspective view of an alternative embodiment 1500 of the invention including tubular members that may be used in conjunction with a bearing member. Male tubular member 1502, female tubular member 1504, and snap on ends 1506 cooperate with bearing members 1600 as shown in FIG. 16. In this embodiment, the tubular members attach to the bearing members 1600 by inserting hooks 1512 into holes 1606 (see below). The device may be made of any material suitable to allow these hooks to flex adequately to fit into position and hold the base secure. Round member 1510 may be raised slightly (no more than the thickness of the base) and insert into hole 1604 of the bearing member.

FIG. 16 shows an alternative embodiment of a bearing member 1600 that may be used to advantage in the subject invention. Spines 1608 extend radially to the edge 1602 of the bearing member 1600. The tubular members connect by snapping in with hooks at connection ports 1606. Optional hole 1604 may correspond to a round stabilizing member on connected tubular member and increase the stability of the connection. Nail holes 1610 may be used to secure the bearing member to an appropriate surface. Adhesive may also be used as described above.

Figure 17:
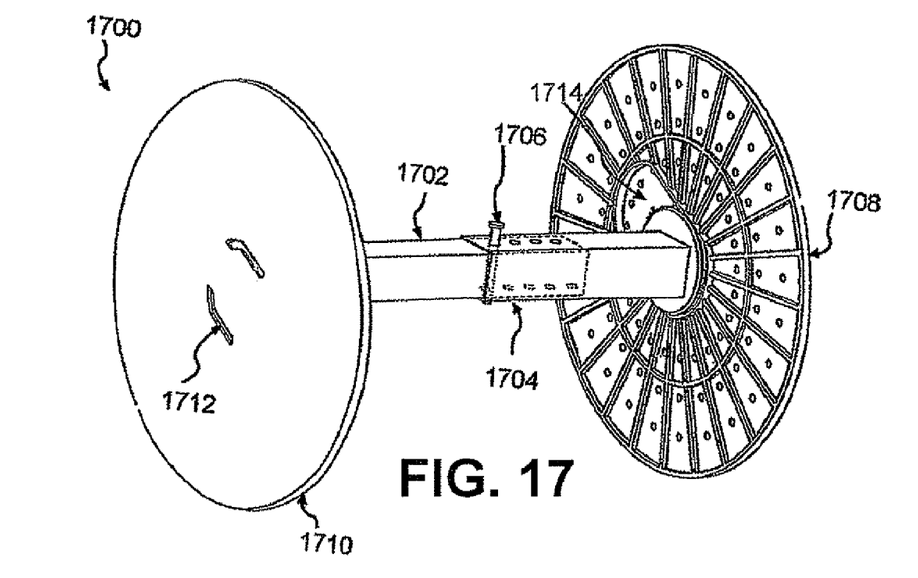
FIG. 17, note again sheet two, is a perspective view of yet another embodiment of the subject load stabilizer invention.

FIG. 17, note again sheet two of the drawings, shows yet another embodiment of the present invention. Void filler 1700 employs a pin-lock mechanism for extending, retracting, and holding in place the tubular members. As shown, the tubular members may be square or triangular in cross section alternatively, they may be round, oval or any other appropriate shape that allows for telescoping with respect to one another. In this embodiment, male tubular member 1702 slides into female member 1704. The holes in 1702 and 1704 are lined up and a pin 1706 is placed through the holes to hold the members in place. Bearing members 1708, holes 1712, and slots 1714 correspond to the similar elements described above with regard to the void filler. In addition there may be a single hole in one of the male and female members and multiple holes in the other member. In addition the holes may be finely spaced longitudinally the next closest hole longitudinally being positioned on an alternative lateral surface so that next adjacent holes longitudinally do not intersect on the same surface of extension member.

Note that although particular extension mechanisms have been described, any suitable extension method and/or apparatus would be acceptable. This may include a ratchet mechanism where the tubular members are easily extended, but cannot move back the opposite direction, or a friction based system where the tubular members are extended and held by locking them and relying on friction to hold them in place.

The subject invention also includes methods of operation to fill voids within a transport container. There is no particular order implied in the steps of the method and they can be performed in any suitable order. In one embodiment, the bearing member attached to a male tubular member is placed flush with a piece of cargo or another surface in the transport container. While this is held in place, the female tubular member with attached base is turned in relation to the male tubular member. This extends the female tubular member toward another surface or cargo in the transport container. The female tubular member is turned until the second bearing member is in contact with the opposing surface and tightened sufficiently. A locknut on the male member is then turned into position to secure the void filler at the desired length.

This method is not exhaustive and can be practiced on any of the embodiment described above. The void filler will be extended using the selected extension mechanism and held in place.

The preceding description has been presented only to illustrate and describe the invention and some examples of its implementation. It is not intended to be exhaustive or to limit the invention to any precise form disclosed. Many modifications and variations are possible and would be envisioned by one of ordinary skill in the art in light of the above teaching.

The various aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims; however, it is not intended that any order be presumed by the sequence of steps recited in the method claims unless a specific order is directly recited.

What is claimed is:

1. An apparatus for stabilizing cargo within a transport container, said apparatus comprising:
    a first tubular member having
        a body having a first end and a second end,
        a first base at said first end having at least one hook,
        a first bearing member,
            said first bearing member of said first tubular member being operable to react against a first surface within said transport container; and
            said first bearing member having at least one hole configured to receive said at least one hook of said first base,
            said first bearing member being selectively removable from said first base by receiving said at least one hook of said first base into said at least one hole of said first bearing member;
    a second tubular member having
        a body having a first end and a second end, and
        a second base at said first end of said second tubular member having at least one hook,
        a second bearing member,
            said second bearing member of said second tubular member being operable to react against a surface opposite to said first surface within the transport container; and
            said second bearing member having at least one hole configured to receive said at least one hook of said second base,
            said second bearing member being selectively removable from said second base by receiving said at least one hook of said second base into said at least one hole of said second bearing member;
    the second end of said second tubular member being configured to engage and selectively translate wit respect to said second end of said first tubular member; and
    an extension mechanism, said extension mechanism being operable to allow selective translation between said first and said second tubular members;
    said extension mechanism being configured to allow relative movement of said first tubular member which defines a male tubular member with respect to said second tubular member which defines a female tubular member;
    wherein said apparatus for stabilizing, being operable to be placed between a surface of cargo to be stabilized and at least one of an opposing surface of other cargo and an internal wall of the transport container, and stabilizes the cargo within the container by extending and filling a space between opposing surfaces within the transport container.

2. The apparatus for stabilizing cargo within a transport container as defined in claim 1, wherein:
    at least one of said first bearing member and said second bearing member further comprises an adhesive area being configured to secure said at least one bearing member to a surface within the transport container.

3. The apparatus for stabilizing cargo within a transport container as defined in claim 1, wherein said extension mechanism comprises:

a screw thread connection between an outer surface of said male tubular member and an inner surface of said female tubular member.

4. The apparatus for stabilizing cargo within a transport container as defined in claim 3 and further comprising:

a locknut carried by screw threads of said male tubular member and being operable to be turned into engagement with a second end of said female tubular member to secure the relative position of said mate tubular member with respect to said female member.

5. The apparatus for stabilizing cargo within a transport container as defined in claim 1 and further comprising:

an axial hole through a center of each of said first and second bearing members; and an axially extending raised member on each of said first base member and said second base member for engagement with said respective axial hole in the center of said first and second bearing members respectively.

6. The apparatus for stabilizing cargo within a transport container as defined in claim 1, wherein said extension mechanism comprises:

said at least one hole of said first bearing member and said at least one hole of said second bearing member each comprise a pair of opposing holes; and said at least one hook of said first base and said at least one hook of said second base each comprise a pair of hooks to be operable received within said pair of holes in each of said first and second bearing members.

* * * * *